(12) United States Patent
Chakraborty et al.

(10) Patent No.: US 11,397,633 B2
(45) Date of Patent: Jul. 26, 2022

(54) UNIFYING SEMI-SUPERVISED APPROACH FOR MACHINE CONDITION MONITORING AND FAULT DIAGNOSIS

(71) Applicant: Siemens Aktiengesellschaft, Munich (DE)

(72) Inventors: Amit Chakraborty, East Windsor, NJ (US); Chao Yuan, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 303 days.

(21) Appl. No.: 16/477,253

(22) PCT Filed: Jan. 22, 2018

(86) PCT No.: PCT/US2018/014619
§ 371 (c)(1),
(2) Date: Jul. 11, 2019

(87) PCT Pub. No.: WO2018/140337
PCT Pub. Date: Aug. 2, 2018

(65) Prior Publication Data
US 2021/0133018 A1 May 6, 2021

Related U.S. Application Data

(60) Provisional application No. 62/450,627, filed on Jan. 26, 2017.

(51) Int. Cl.
*G06F 11/07* (2006.01)
*G06N 20/00* (2019.01)
*G06F 16/28* (2019.01)

(52) U.S. Cl.
CPC ...... *G06F 11/0769* (2013.01); *G06F 11/0721* (2013.01); *G06F 16/285* (2019.01); *G06N 20/00* (2019.01)

(58) Field of Classification Search
CPC .. G06F 11/079; G06F 11/0721; G06F 16/285; G06N 20/00
See application file for complete search history.

(56) References Cited

U.S. PATENT DOCUMENTS

| 10,713,769 B2 * | 7/2020 | Zhang ................. G06N 3/0472 |
| 2009/0043536 A1 * | 2/2009 | Balderer ................ G06K 9/622 |
| | | 702/179 |

(Continued)

OTHER PUBLICATIONS

International Search Report dated May 9, 2018; PCT application No. PCT/US2018/014619; PCT filing date: Jan. 22, 2018; 17 pages.

(Continued)

*Primary Examiner* — Jonathan D Gibson

(57) ABSTRACT

A computer-implemented method for performing machine condition monitoring for fault diagnosis includes collecting multivariate time series data from a plurality of sensors in a machine and partitioning the multivariate time series data into a plurality of segment clusters. Each segment cluster corresponds to one of a plurality of class labels related to machine condition monitoring. Next, the segment clusters are clustered into segment cluster prototypes. The segment clusters and the segment cluster prototypes are used to learn a discriminative model that predicts a class label. Then, as new multivariate time series data is collected from the sensors in the machine, the discriminative model may be used to predict a new class label corresponding to segments included in the new multivariate time series data. If the new class label indicates a potential fault in operation of the machine, a notification may be provided to one or more users.

18 Claims, 4 Drawing Sheets

(56) References Cited

U.S. PATENT DOCUMENTS

| | | | | |
|---|---|---|---|---|
| 2012/0304008 | A1* | 11/2012 | Hackstein | G05B 23/0229 |
| | | | | 714/26 |
| 2013/0332773 | A1* | 12/2013 | Yuan | G05B 23/0205 |
| | | | | 714/26 |
| 2013/0346346 | A1* | 12/2013 | Criminisi | G06N 20/20 |
| | | | | 706/12 |
| 2019/0258927 | A1* | 8/2019 | Chen | G06N 3/08 |
| 2021/0133018 | A1* | 5/2021 | Chakraborty | G06F 11/0721 |
| 2021/0192292 | A1* | 6/2021 | Zhai | G06Q 10/0639 |

OTHER PUBLICATIONS

Gabrys Bogdan et al: "Combining labelled and unlabelled data in the design of pattern classification systems", International Journal of Approximate Reasoning, Elsevier Science, New York, NY, US, vol. 35, No. 3, pp. 251-273, XP007901506, ISSN: 0888-613X / Jan. 3, 2004.

Yi Wang et al: "Mining Naturally Smooth Evolution of Clusters from Dynamic Data" In: "Proceedings of the 2007 SIAM International Conference on Data Mining", Apr. 26, 2007 (Apr. 26, 2007), Society for Industrial and Applied Mathematics, Philadelphia, PA, XP55471040.

* cited by examiner

UNIFYING SEMI-SUPERVISED APPROACH FOR MACHINE CONDITION MONITORING AND FAULT DIAGNOSIS

CROSS-REFERENCE TO RELATED APPLICATIONS

This application is a national phase filing under 35 U.S.C. § 371 of International Patent Application No. PCT/US2018/014619, filed Jan. 22, 2018, which claims the benefit of priority to U.S. Provisional Patent Application Ser. No. 62/450,627, filed Jan. 26, 2017, which are incorporated herein by reference in their entirety.

TECHNICAL FIELD

The present disclosure relates generally to for machine condition monitoring and fault diagnosis. The technology described herein is particularly well-suited for, but not limited to, condition monitoring of machines in industrial automation applications.

BACKGROUND

The task of machine condition monitoring is to detect machine failures at an early stage such that maintenance can be carried out in a timely manner. There are two important applications in machine condition monitoring. In fault detection, the goal is to tell normal behavior from abnormal behavior. In fault diagnosis (pattern recognition), the objective is to tell normal behavior from each of the failure behaviors.

More formally, our goal is to make a decision $c_t$ at every time stamp t for a machine based on its multivariate sensor signals $z_t$. This can be mathematically expressed by finding the $c_t$ that maximizes the following probability $$P(c_t|z_t) \propto P(z_t|c_t)P(c_t) \qquad (1)$$

K is the number of failure types we pre-define. For a fault detection problem, we have K=1 because we don't distinguish different failure types. For a pattern recognition problem, we have K≥1 and there should be at least one failure type.

Most existing machine condition algorithms are supervised approaches. They require human experts to provide training data for normal class and each of the failure class. However, user annotation can be difficult to acquire and is also prone to mistake. In addition, experts or knowledge of such training data are often unavailable. In the latter case, it is impossible to apply the existing supervised approaches for machine condition monitoring.

Unsupervised techniques, on the other hand, are more user friendly. They use all data available without annotation by performing segmentation and classification simultaneously. However, without any supervision or constraints, there will be many possibilities to build the model. As a result, the learned model may not be meaningful or reflect the intrinsic patterns of sensor signals.

SUMMARY

Embodiments of the present invention address and overcome one or more of the above shortcomings and drawbacks, by providing methods, systems, and apparatuses related to a semi-supervised approach for machine condition monitoring and fault diagnosis. Briefly, a framework is employed that uses three components: time series segmentation, prototype selection, and supervised learning. The inputs of the framework are multivariate sensor time series from multiple machines. The output of the framework is a discriminated model for machine condition monitoring that gives class label for every time stamp of a future test time series. Once generated, this discriminative model can be used to monitor the condition of machines based on newly collected sensor data.

According to some embodiments, a computer-implemented method for performing machine condition monitoring for fault diagnosis includes collecting multivariate time series data from a plurality of sensors in a machine and partitioning the multivariate time series data into a plurality of segment clusters. Each segment cluster corresponds to one of a plurality of class labels related to machine condition monitoring (e.g., a "normal" class label and one or more "failure" class labels). Next, the segment clusters are clustered into segment cluster prototypes. The segment clusters and the segment cluster prototypes are used to learn a discriminative model that predicts a class label. Then, as new multivariate time series data is collected from the sensors in the machine, the discriminative model may be used to predict a new class label corresponding to segments included in the new multivariate time series data. If the new class label indicates a potential fault in operation of the machine, a notification may be provided to one or more users.

According to another aspect of the present invention, An article of manufacture for performing machine condition monitoring for fault diagnosis comprises a non-transitory, tangible computer-readable medium holding computer-executable instructions for performing the aforementioned method.

According to other embodiments of the present invention, a system for performing machine condition monitoring for fault diagnosis comprises a plurality of software components configured to perform machine condition monitoring operations and one or more processors configured to execute the plurality of software components. These software components may include, for example, a time series segmentation component, a prototype selection component, and a prototype selection component. The time series segmentation component collects multivariate time series data from a plurality of sensors in a machine and (b) partitions the multivariate time series data into a plurality of segment clusters. Each segment cluster corresponds to one of a plurality of class labels related to machine condition monitoring. In one embodiment, the time series segmentation component partitions the multivariate time series data into the plurality of segment clusters using a previously generated discriminative model. The prototype selection component clusters the segment clusters into segment cluster prototypes. The prototype selection component uses the segment clusters and the segment cluster prototypes to learn a discriminative model that predicts a class label. In some embodiments the system further includes a user interface that allows a user to enter values to configure the respective software component.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to a semi-supervised machine condition monitoring framework. This framework considers most possible scenarios of training a monitoring algorithm. According to some embodiments, the frameworks comprise three components: time series segmentation, prototype selection and supervised learning. When no supervision is available, framework uses the workflow of a typical unsupervised approach. Supervision can be optionally added to the segmentation part, the prototype selection part or the supervised learning part. The learning process can be iterative such that learning is repeated until convergence.

Figure 1:
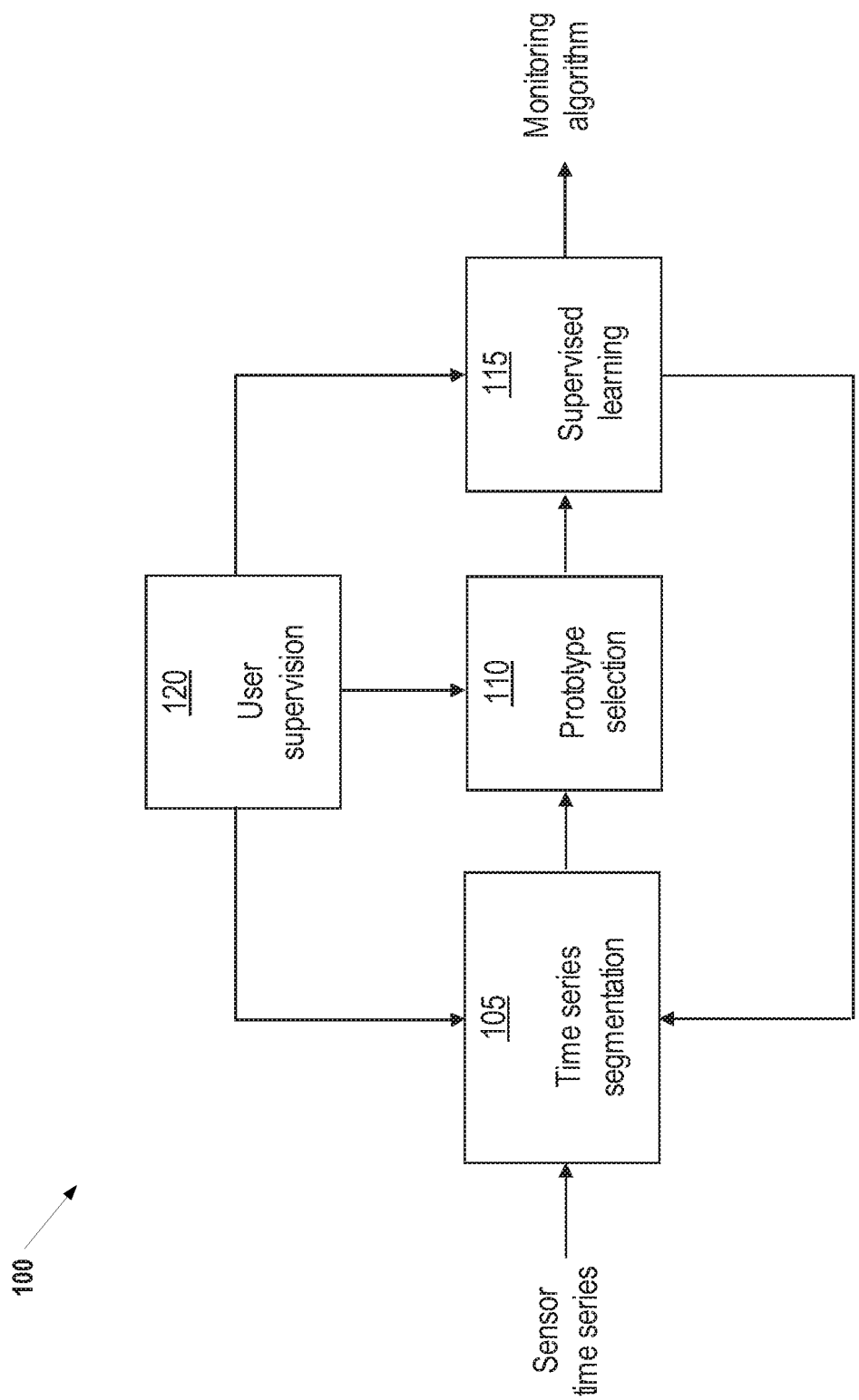
FIG. 1 shows a workflow diagram of the proposed semi-supervised framework for learning a monitoring algorithm, according to some embodiments.

FIG. 1 shows a workflow diagram of the proposed semi-supervised framework for learning a monitoring algorithm, according to some embodiments. The inputs of the system are multivariate sensor time series from multiple machines. The output is the learned algorithm for machine condition monitoring that will gives class label for every time stamp of a future test time series. Once generated, this learned algorithm can be used to monitor the condition of machines based on newly collected sensor data.

The workflow framework 100 shown in FIG. 1 includes a plurality of components, described in greater detail below. The term "component," as used herein refers to one or more software modules that perform a specific functionality. For example, a component may be an autonomously executable program or subroutine, or to a collection of functions that are not per se independently executable. Thus, the term component encompasses in particular function and class libraries as well as collections of plug-ins and/or assemblies, or the like.

In the Time Series Segmentation Component 105, the entire multivariate time series is partitioned into segments without overlapping. The goal is to preprocess the time series and find common segment clusters that are shared within the same time series or across multiple time series. Ideally, the best segmentation is the one that produces clusters exactly corresponding to classes we are trying to predict.

Figure 2:
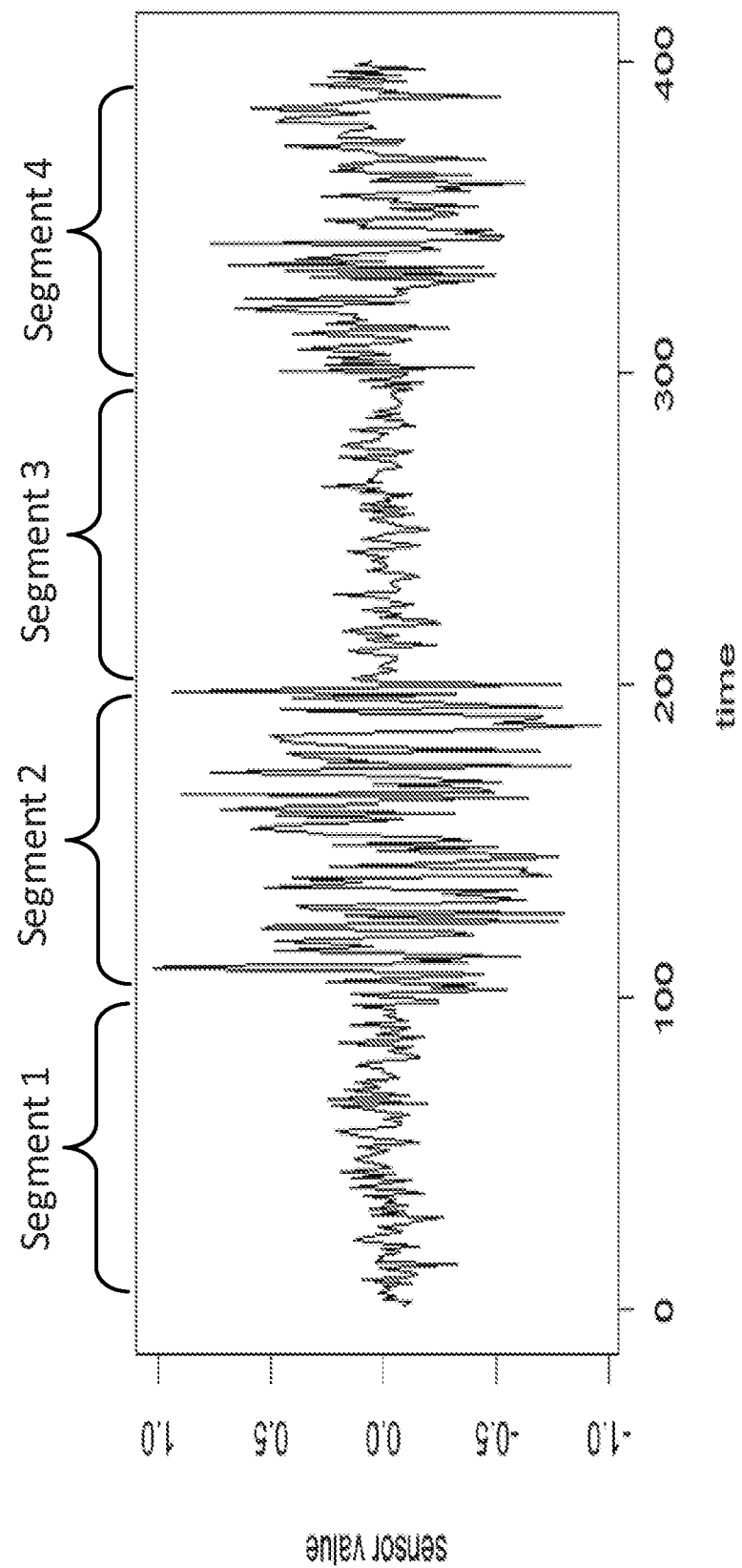
FIG. 2 shows an example time series segmentation.

FIG. 2 shows an example time series segmentation. The ground truth indicates that this time series contains four segments and three clusters. Segments 1 and 3 belong to the normal cluster. Segment 2 belongs to failure type 1 cluster and segment 4 belongs to failure type 2 cluster. In some embodiments, a hidden semi-Markov model (HSMM) is used to perform this unsupervised time series segmentation. The observation (emission) model in the HSMM can be any generative model such as Gaussian mixture model. Mathematically, this is expressed by $$P(s_{1:T}|z_{1:T}),\qquad(2)$$

where T is the total length of the time series. $s_t$ is the segment cluster label. As an alternative to HSMM, a regular hidden Markov model or other similar technique may be employed in other embodiments of the present invention. In the example shown in FIG. 2, $s_t$ is normal for the first 100 time stamps and becomes failure type 2 for the last 100 time stamps. Because of the complexity of this problem, a brutal force approach is prohibitive. The techniques described herein employ dynamic programming techniques to break the problem into a collection of simpler sub-problems that can then be solved individually.

After segmentation, the Prototype Selection Component 110 treats the segment clusters as the class labels that should be predicted based on the collected sensor data. Using entire segments of time series to learn a model is often infeasible. It is also not necessary because segments from the same cluster contain lots of redundancy and data repetition. The Prototype Selection Component 110 reduces the complexity of the overall dataset by clustering the segment clusters into "segment cluster prototypes" that correspond to class labels. The Prototype Selection Component 110 can apply, for example, standard clustering algorithm such as k-mean or spectral clustering to all segments within each segment cluster. The cluster centers found by the clustering algorithm will become segment cluster prototypes.

The Supervised Learning Component 115 learns a monitoring algorithm using training data for each class we try to predict. Any supervised discriminative algorithms such as support vector machines, decision trees or deep learning can be used here. Once the monitoring algorithm is learned by the Supervised Learning Component 115, it can be used to refine the time series segmentation performed by the Time Series Segmentation Component 105 (see the feedback loop in FIG. 1). This may be done, for example, by replacing the generative observation model in the HSMM such as Gaussian mixture model with the newly learned discriminative model. This loop can be repeated until convergence or until some other user-selected condition occurs.

User Supervision 120 or feedback can be added to each of the aforementioned components in the framework 100 discuss above with reference to FIG. 1. For example, with respect to Time Series Segmentation Component 105, the user can specify the number of segment clusters. After validation of segmentation results, the user can assign a class label to a particular segment cluster (e.g., failure type 2 to the third segment cluster in FIG. 2). In another scenario, in which after a major maintenance the machine is fault-free but the model needs retraining, the user can tell the framework that the entire next month data (one single segment) can be viewed as normal class. The user can also mark a certain segment as a mistake. In this case, the algorithm will view such segments as confusing or outliers and will not include such segments in learning segment clusters. The user can also merge or split segment clusters.

Regarding the Prototype Selection Component 110, in some embodiments, prototypes can be fully specified by the user. In this case, prototype selection step will be skipped. If prototypes are partially set by the user, the clustering algorithm discussed above will be applied with these manually set prototypes fixed. For the Supervised Learning Component 115, the user can introduce expert rules to guide the learning algorithm. These rules can be directly integrated with the algorithm in some embodiments. In other embodiments, the rules can be used to simulate training samples for learning the algorithm. Such use of expert rules is described generally in U.S. Pat. No. 8,868,985 issued Oct. 21, 2014, entitled "Supervised fault learning using rule-generated samples for machine condition monitoring," the entirety of which is incorporated herein by reference.

Figure 3:
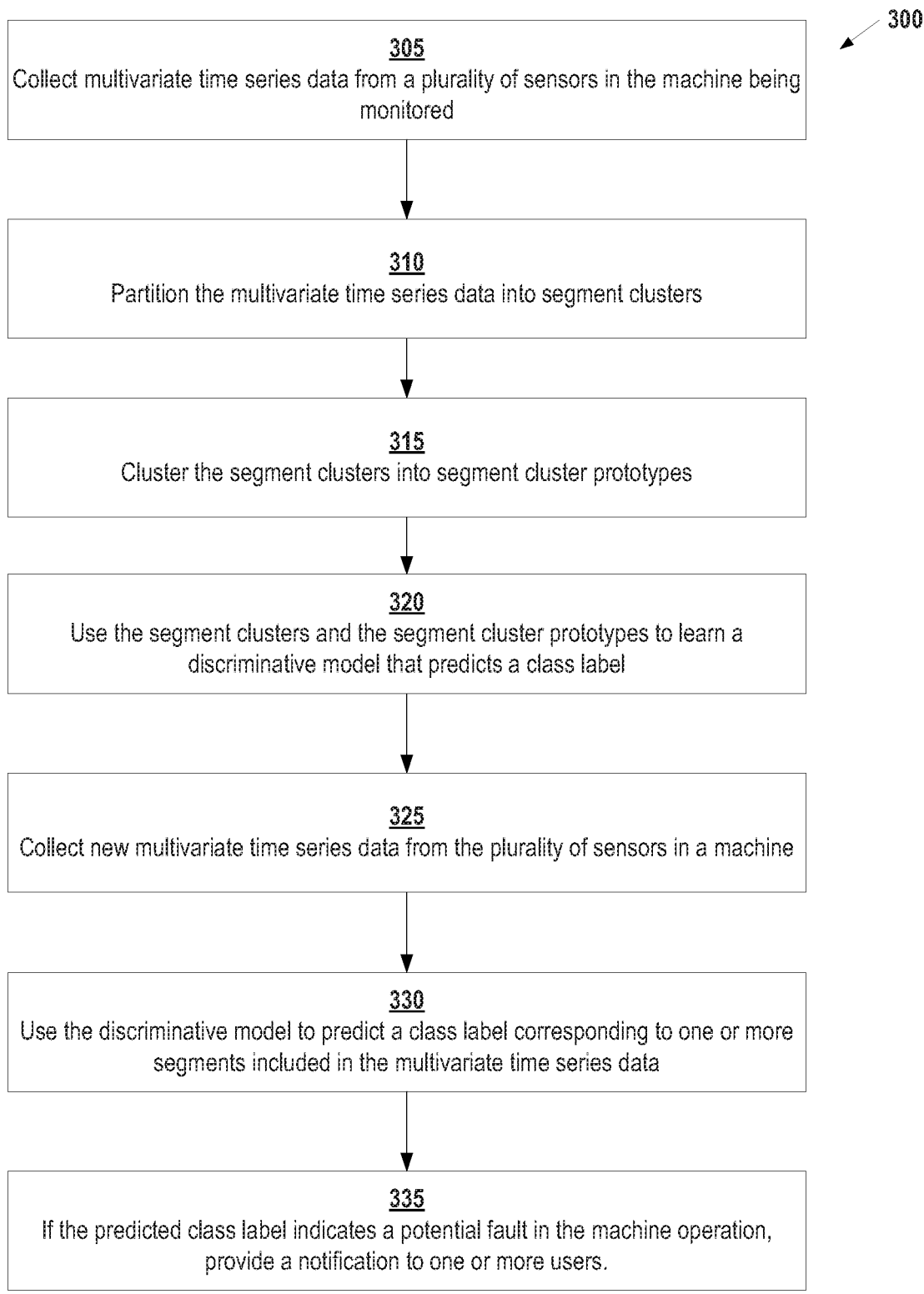
FIG. 3 flow chart illustrating a method, for performing machine condition monitoring for fault diagnosis, according to some embodiments.

FIG. 3 flow chart illustrating a method 300, for performing machine condition monitoring for fault diagnosis, according to some embodiments. This method 300 illustrates how the framework 100 shown in FIG. 1 can be applied. The method 300 is intended to be performed by a computing system connected either directly or indirectly (e.g., via network) to one or more machines. The method 300 is explained with reference to a single machine; however, it should be understood that the method can be scaled to any number of machines.

Starting at step 305, multivariate time series data is collected from a plurality of sensors in the machine being monitored. Various techniques generally known in the art may be used to collect sensor values from the sensors. For example, in some embodiments, each sensor includes a transmitter that allows the sensor to push sensor values to the computing system performing the method 300. These values may be pushed, for example, as they are generated or at regular intervals. In other embodiments, the computing system performing the method 300 may periodically retrieve sensor data to the computing system. The method used for collecting sensor data will vary depending on the type of sensors being analyzed and other aspects of the computing architecture in which the sensors operate. For example, in a factory other industrial setting, the sensors and the computing system may communicate using a local wired or wireless network. In a more distributed setting, where sensors are geographically dispersed, the Internet may be used for communications between the sensors and the computing system.

At step 310, the multivariate time series data is partitioned into segment clusters. Each segment cluster corresponds to one of a plurality of class labels related to machine condition monitoring. Examples of class labels include a "normal class label" indicating normal operation of a machine and one or more "failure class labels" corresponding to failure of the machine. In some embodiments, the class label additionally provides the reason for failure. In some embodiments, a HSMM or similar technique is used to perform unsupervised time series segmentation. In some embodiment, partitioning of the multivariate time series data into the segment clusters is constrained by user-supplied values specifying the number of segment clusters. In this way, the user can limit the complexity and, by extension, the processing time of learning the discriminative model.

In other embodiments, the user manually supplies labels for segment clusters after they are created. For example, the user may specify via a graphical user interface (GUI) or other input mechanism that a particular set of segment clusters correspond to a normal operation of the machine and, thus, these segment clusters should be labeled with the normal class label discussed above. In other embodiments, the user may provide input splitting one or more segment clusters into multiple segment clusters. Similarly in come embodiments, the user may provide input combining multiple segment clusters into a single segment cluster.

Continuing with reference to FIG. 3, at step 315, the segment clusters are clustered into segment cluster prototypes. The segment clusters may be clustered into segment cluster prototypes by applying a k-means clustering algorithm, a spectral clustering algorithm, or any other clustering algorithm generally known in the art. In one embodiment, the segment clusters are clustered into the plurality of segment cluster prototypes based on user input. For example, a user may be presented with a visualization of the segment clusters in a GUI. The user can then perform one or more operations via the GUI to manually create the segment cluster prototypes. For example, in one embodiment, the user clicks on segment clusters and drags them into one another to create segment cluster prototypes.

Using the segment clusters and the segment cluster prototypes, a discriminative model is learned at step 320. This discriminative model predicts a class label based on given inputs of segment cluster prototypes. In some embodiments, the method further includes receiving user input specifying expert rules and then using the expert rules to guide learning of discriminative model. Next, at step 325, new multivariate time series data is collected from the sensors in the machine. The discriminative model is used at step 330 to predict a class label corresponding to one or more segments included in the multivariate time series data. Additionally, the model may be used as feedback into one or more of the other steps in the method 300. For example, in some embodiments, the learned discriminative model is used as input into the HSMM for use in partitioning of future multivariate time series data (see FIG. 1).

If the predicted class label indicates a potential fault in the machine operation, a notification is provided to one or more users at step 335. For example, in some embodiments, users can receive an e-mail, text message, or other alert indicating a fault is predicted. The users contacted in this case may be pre-loaded on the computing system along with their corresponding contact information. In some embodiments, different users are contacted depending on the type of failure that is predicted. In addition to providing a notification, a record may be created, either stored locally at the computing system or remotely on another storage medium, indicating the predicted time and other relevant information related to the machine fault.

Figure 4:
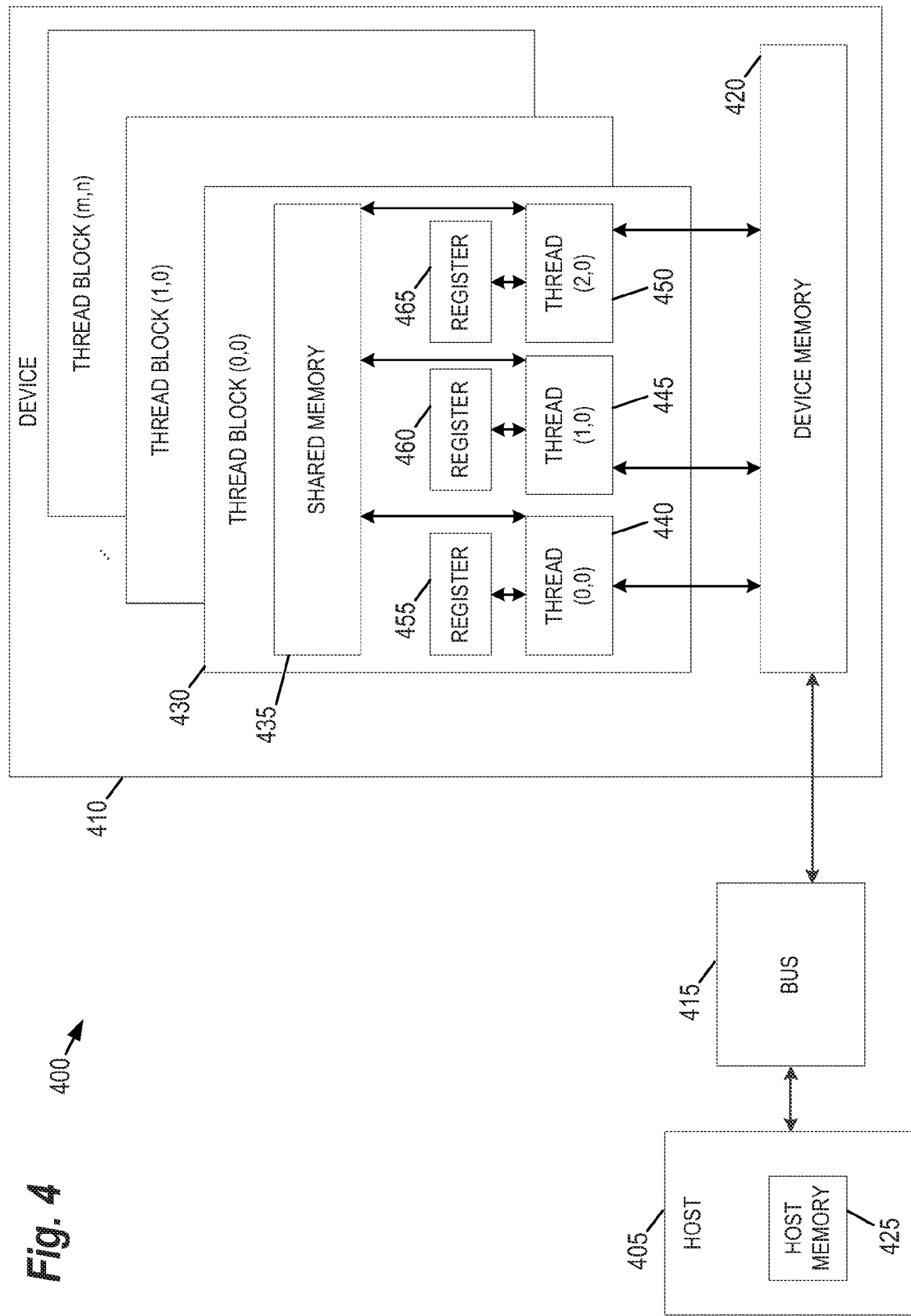
FIG. 4 provides an example of a parallel processing memory architecture that may be utilized to perform computations related to performing machine condition monitoring for fault diagnosis, according to some embodiments of the present invention.

FIG. 4 provides an example of a parallel processing memory architecture 400 that may be utilized to perform computations related to performing machine condition monitoring for fault diagnosis, according to some embodiments of the present invention. This architecture 400 may be used in embodiments of the present invention where NVIDIA™ CUDA (or a similar parallel computing platform) is used. The architecture includes a host computing unit ("host") 405 and a GPU device ("device") 410 connected via a bus 415 (e.g., a PCIe bus). The host 405 includes the central processing unit, or "CPU" (not shown in FIG. 4) and host memory 425 accessible to the CPU. The device 410 includes the graphics processing unit (GPU) and its associated memory 420, referred to herein as device memory. The device memory 420 may include various types of memory, each optimized for different memory usages. For example, in some embodiments, the device memory includes global memory, constant memory, and texture memory.

Parallel portions of a deep learning application may be executed on the architecture 400 as "device kernels" or simply "kernels." A kernel comprises parameterized code configured to perform a particular function. The parallel computing platform is configured to execute these kernels in an optimal manner across the architecture 400 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by grid of thread blocks (described in greater detail below). Using concurrent kernel execution, streams, and synchronization with lightweight events, the architecture 400 of FIG. 4 (or similar architectures) may be used to parallelize training of a deep neural network. For example, in some embodiments, hierarchical clustering techniques are employed such that the segment clusters can be processed separately during creation of the segment prototypes.

The device 410 includes one or more thread blocks 430 which represent the computation unit of the device 410. The term thread block refers to a group of threads that can cooperate via shared memory and synchronize their execution to coordinate memory accesses. For example, in FIG. 4, threads 440, 445 and 450 operate in thread block 430 and access shared memory 435. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 4, the thread blocks 430 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints. In some embodiments, the operations associated with processing of segment prototypes during training of the discriminative model partitioned over thread blocks automatically by the parallel computing platform software. However, in other embodiments, the individual thread blocks can be selected and configured to optimize training of the discriminative model. For example, in one embodiment, each thread block is assigned prototypes with similar or overlapping values.

Continuing with reference to FIG. 4, registers 455, 460, and 465 represent the fast memory available to thread block 430. Each register is only accessible by a single thread. Thus, for example, register 455 may only be accessed by thread 440. Conversely, shared memory is allocated per thread block, so all threads in the block have access to the same shared memory. Thus, shared memory 435 is designed to be accessed, in parallel, by each thread 440, 445, and 450 in thread block 430. Threads can access data in shared memory 435 loaded from device memory 420 by other threads within the same thread block (e.g., thread block 430). The device memory 420 is accessed by all blocks of the grid and may be implemented using, for example, Dynamic Random-Access Memory (DRAM).

Each thread can have one or more levels of memory access. For example, in the architecture 400 of FIG. 4, each thread may have three levels of memory access. First, each thread 440, 445, 450, can read and write to its corresponding registers 455, 460, and 465. Registers provide the fastest memory access to threads because there are no synchronization issues and the register is generally located close to a multiprocessor executing the thread. Second, each thread 440, 445, 450 in thread block 430, may read and write data to the shared memory 435 corresponding to that block 430. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 410 to read and/or write to the device memory. Device memory requires the longest time to access because access must be synchronized across the thread blocks operating on the device. Thus, in some embodiments, the processing of each segment cluster prototype is coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 4, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) unless the element is expressly recited using the phrase "means for."

The invention claimed is:

1. A computer-implemented method for performing semi-supervised machine condition monitoring for fault diagnosis, the method comprising:
    collecting multivariate time series data from a plurality of sensors in a machine;
    performing unsupervised time series segmentation by partitioning the multivariate time series data into a plurality of segments and a plurality of segment clusters, wherein each segment cluster corresponds to one of a plurality of class labels related to machine condition monitoring;
    clustering the plurality of segment clusters into a plurality of segment cluster prototypes;
    using the segment clusters and the segment cluster prototypes to learn a discriminative model that predicts a class label;
    collecting new multivariate time series data from the plurality of sensors in the machine;
    using the discriminative model to predict a new class label corresponding to one or more segments included in the new multivariate time series data; and
    if the new class label indicates a potential fault in operation of the machine, providing a notification to one or more users.

2. The method of claim 1, wherein the plurality of class labels comprise a normal class label corresponding to normal machine operation and one or more failure class labels corresponding to failure of the machine.

3. The method of claim 1, wherein the multivariate time series data is partitioned into the plurality of segment clusters using a hidden semi-Markov model (HSMM) to perform the unsupervised time series segmentation.

4. The method of claim 3, further comprising:
    following learning of the discriminative model, using the discriminative model as input into the HSMM for use in partitioning of future multivariate time series data.

5. The method of claim 1, wherein the segment clusters are clustered into the segment cluster prototypes by applying a clustering algorithm to all segments within each segment clusters.

6. The method of claim 5, wherein the clustering algorithm is a k-means clustering algorithm.

7. The method of claim 5, wherein the clustering algorithm is a spectral clustering algorithm.

8. The method of claim 1, wherein the segment clusters are clustered into the segment cluster prototypes based on user input.

9. The method of claim 1, wherein partitioning of the multivariate time series data into the plurality of segment clusters is constrained by one or more user-supplied values specifying the number of segment clusters.

10. The method of claim 1, further comprising:
    following partitioning the multivariate time series data into the plurality of segment clusters, receiving user input providing a class label for each segment cluster.

11. The method of claim 1, further comprising:
    following partitioning the multivariate time series data into the plurality of segment clusters, receiving user input splitting one or more segment clusters into multiple segment clusters; and
    replacing the one or more segment clusters in the plurality of clusters with the multiple segment clusters.

12. The method of claim 1, further comprising:
    following partitioning the multivariate time series data into the plurality of segment clusters, receiving user input merging multiple segment clusters into a single segment cluster; and
    replacing the multiple segment clusters in the plurality of clusters with the single segment cluster.

13. The method of claim 1, further comprising:
    receiving user input comprising one or more expert rules; and
    using the expert rules to guide learning of the discriminative model.

14. The method of claim 1, further comprising:
    adding supervision to the time segmentation based on the output of the discriminative model; and
    repeating the method iteratively until convergence.

15. A system for performing machine condition monitoring for fault diagnosis, the system comprising:
    a plurality of software components configured to perform machine condition monitoring operations, the plurality of software components comprising:
        a time series segmentation component configured to (a) collect multivariate time series data from a plurality of sensors in a machine and (b) perform unsupervised time series segmentation by partitioning the multivariate time series data into a plurality of segment clusters, wherein each segment cluster corresponds to one of a plurality of class labels related to machine condition monitoring;
        a prototype selection component configured to cluster the plurality of segment clusters into a plurality of segment cluster prototypes; and
        a supervised learning component configured to use the segment clusters and the segment cluster prototypes to learn a discriminative model that predicts a class label;
        wherein the time series segmentation component is further configured to collect new multivariate time series data from the plurality of sensors in the machine;
        wherein the supervised learning component is further configured (a) to use the discriminative model to predict a new class label corresponding to one or more segments included in the new multivariate time series data; and (b) if the new class label indicates a potential fault in operation of the machine, provide a notification to one or more users; and
    one or more processors configured to execute the plurality of software components.

16. The system of claim 15, wherein each of the plurality of software components includes a user interface that allows a user to enter values to configure the respective software component.

17. The system of claim 15, wherein the time series segmentation component partitions the multivariate time series data into the plurality of segment clusters using a previously generated discriminative model.

18. An article of manufacture for performing machine condition monitoring for fault diagnosis, the article of manufacture comprising a non-transitory, tangible computer-readable medium holding computer-executable instructions for performing a method comprising:
- collecting multivariate time series data from a plurality of sensors in a machine;
- performing unsupervised time series segmentation by partitioning the multivariate time series data into a plurality of segments and a plurality of segment clusters, wherein each segment cluster corresponds to one of a plurality of class labels related to machine condition monitoring;
- clustering the plurality of segment clusters into a plurality of segment cluster prototypes;
- using the segment clusters and the segment cluster prototypes to learn a discriminative model that predicts a class label;
- collecting new multivariate time series data from the plurality of sensors in the machine;
- using the discriminative model to predict a new class label corresponding to one or more segments included in the new multivariate time series data; and
- if the new class label indicates a potential fault in operation of the machine, providing a notification to one or more users.

* * * * *